Feb. 5, 1935.  C. A. FERGUSON  1,990,119
THRUST BEARING
Filed Sept. 21, 1933
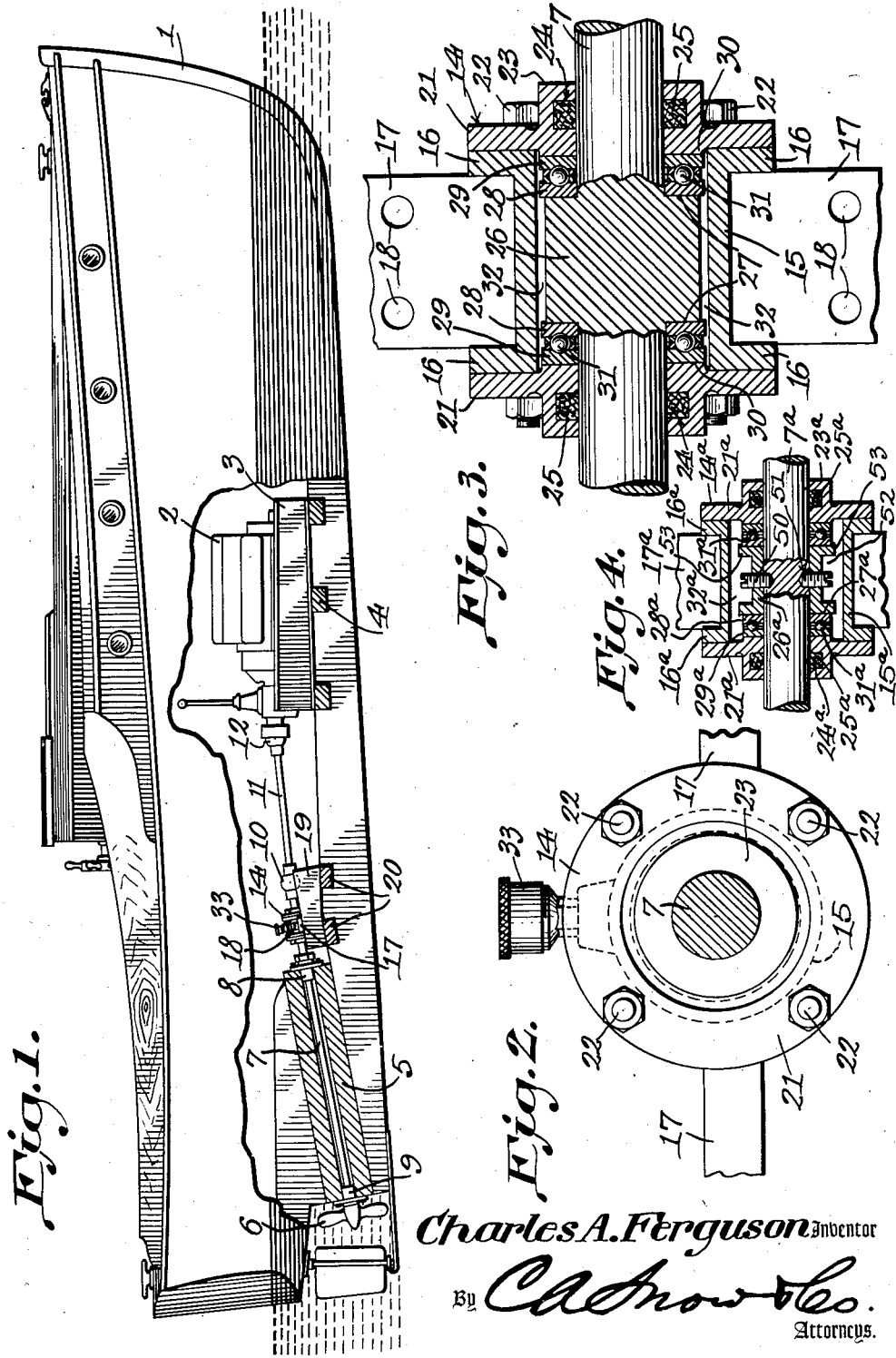
Charles A. Ferguson Inventor
By C.A.Snow&Co.
Attorneys.

Patented Feb. 5, 1935

1,990,119

UNITED STATES PATENT OFFICE 1,990,119

THRUST BEARING

Charles A. Ferguson, North East, Md.

Application September 21, 1933, Serial No. 690,457

1 Claim. (Cl. 308—233)

This invention aims to provide a simple but efficient means for taking care of the thrust in the propeller shaft of a water-craft, and to provide adequate and proper lubrication for the instrumentality which receives the thrust.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in side elevation, a boat whereon the device forming the subject matter of this application has been mounted;

Fig. 2 is a transverse section through the device itself;

Fig. 3 is a horizontal section taken through the article shown in Fig. 2.

Fig. 4 is a sectional view showing a slight modification.

The device forming the subject matter of this application is adapted to be used under a wide variety of conditions, but, by way of illustration, there is shown in Fig. 1, the hull 1 of a boat, the engine 2 being mounted on fore and aft beams 3 carried by the engine bed timbers 4. The shaft log is shown at 5 and the propeller at 6, the propeller being connected to a shaft section 7, which may be referred to as a first shaft section, the shaft section 7 being journaled in a forward shaft bearing 8 and in a stern bearing 9 on the shaft log 5. The shaft section 7 is operatively connected with the engine 2 in many different ways. For instance, the forward end of the shaft section 7 may be connected by a universal joint 10 to a shaft section 11, which, in its turn, is connected by a universal joint 12 to the shaft of the engine 2. When the propeller 6 is working ahead there is a forward thrust on the shaft 7, and when the propeller is working aback, the thrust is in the opposite direction. These are simple matters well understood by any boatman. The thrust referred to is likely to make trouble at any point from the propeller 6 to the engine 2, and problems arising out of propeller thrust need not be discussed in detail.

The invention embodies a casing 14, comprising a cylindrical member 15, provided between its upper and lower surfaces with rigid, outstanding, laterally projecting foot plates 17, located in a common plane with the shaft section 7, the member 15 being supplied at its ends with outstanding annular flanges 16, joined to the edges of the foot plates 17, at the inner ends of the foot plates 17. The foot plates 17 are secured at 18 to fore and aft beams 19, secured to cross timbers 20, forming part of the frame work of the hull.

End plates 21 are provided, and they are secured to the outstanding flanges 16 of the cylindrical member 15 of the casing 14 by means of securing elements 22, such as bolts, passing through the plates 21, and through the flanges 16. The end plates 21 have central, outwardly-extended projections 23, provided with internal recesses 24, in which packings 25 are mounted. The shaft section 7 is journaled for rotation in the end plates 21 and in the projections 23, and is surrounded by the packings 25.

The shaft section 7 has an enlarged cylindrical portion 26, located within the member 15 of the casing 14. The ends of the enlarged portion 26 of the shaft section 7 form shoulders 27, against which abut inner rings 28 mounted on the shaft section 7. The outer rings 29 are mounted on the shaft section 7 and abut against inwardly prolonged extensions 30 on the central portions of the end plates 21. Ball bearings 31, or antifriction bearings of any other desired kind, surround the shaft section 7 and are located between the rings 28 and 29. The diameter of the projections 30 on the end plates 21, the diameter of the rings 28 and 29, and the diameter of the ball bearings 31, are all less than the internal diameter of the cylindrical member 15 of the casing 14. Therefore, there exists within the member 15 of the casing 14, about the parts specified, an annular space 32, by which a lubricant can flow readily to all of the parts which are interposed between the shoulders 27 and the end plates 21. Oil is supplied to the space 32 by any suitable means, such as an oil cup 33, secured on top of the cylindrical member 15 of the casing 14.

In Fig. 4, parts hereinbefore described have been designated by numerals previously used, with the suffix "a". The enlargement 26a on the shaft section 7a is not integrally with the shaft section, as in Fig. 3, but is a separate member, held on the shaft section by set screws 50, having their inner ends received in seats 51 in the shaft section 7a. Moreover, the member 26a has a circumferential recess 52, defining end flanges 53, the recess 52 giving more room for oil than does the structure shown in Fig. 3.

In practical operation, the foot plates 17 are rigidly secured to the beams 19 or their equivalent, and rigidity in the cylindrical member 15 of the casing 14 thus is secured, so far as fore and aft movement is concerned. The end plates 21 are rigidly secured to the flanges 16 of the member 15 by the through bolts or securing elements 22, and the rings 28 and 29, together with the ball bearings 31, cooperate with the part 26 of the shaft 7, or with the part 26a of the shaft 7a, to take up the end thrust. The structure is useful in all installations, but it is particularly useful when there are a plurality of shaft sections, connected by such elements as the universal joints 10 and 12, the shaft, as a whole being disposed out of a straight line. The device is so constructed that it can be used with any sort of an engine, and it is unnecessary to build thrust bearings into the engine proper.

Having thus described the invention, what is claimed is:

A device for taking thrust in the propeller shaft of a boat, comprising a cylindrical casing provided between its upper and lower surfaces with oppositely-disposed, outstanding foot plates, the casing being supplied at its ends with outstanding annular flanges joined to the inner portions of the foot plates, the foot plates extending outwardly beyond the flanges and being provided with means whereby the foot plates may be fastened to the timbers of a boat, with the lower part of the casing extending downwardly below the upper surfaces of said timbers, end plates mounted on the flanges, securing devices passing through the end plates and the flanges, the inner portions of the foot plates reinforcing the flanges when the securing devices are tightened, and a shaft journaled in the end plates and carrying an enlargement located in the casing, between the end plates, the foot plates being located in a common plane with the shaft.

CHARLES A. FERGUSON.